United States Patent [19]

Röhringer et al.

[11] Patent Number: 5,027,916
[45] Date of Patent: Jul. 2, 1991

[54] HYDRAULIC AUXILIARY-FORCE CONTROL OF STEERING

[75] Inventors: Arno Röhringer, Ditzingen; Reinhold Abt, Neuhausen; Ernst Fasse, Waiblingen; Wolfgang Jörg, Stuttgart, all of Fed. Rep. of Germany

[73] Assignee: Daimler-Benz AG, Fed. Rep. of Germany

[21] Appl. No.: 563,190

[22] Filed: Aug. 6, 1990

[30] Foreign Application Priority Data

Aug. 5, 1989 [DE] Fed. Rep. of Germany ....... 3925992

[51] Int. Cl.$^5$ .............................................. B62D 5/06
[52] U.S. Cl. .................................. 180/132; 137/625.25
[58] Field of Search ....................... 180/132, 146, 147; 137/625.25

[56] References Cited

U.S. PATENT DOCUMENTS 4,759,259 7/1988 Wörner et al. ........................ 91/374

FOREIGN PATENT DOCUMENTS

| 77710 | 4/1983 | European Pat. Off. ............ 180/132 |
| 190960 | 8/1986 | European Pat. Off. . |
| 1924032 | 11/1970 | Fed. Rep. of Germany . |
| 847213 | 9/1960 | United Kingdom . |
| 1603198 | 11/1981 | United Kingdom ................ 180/132 |

Primary Examiner—Charles A. Marmor
Assistant Examiner—Mitchell Bompey
Attorney, Agent, or Firm—Evenson, Wands, Edwards, Lenahan & McKeown

[57] ABSTRACT

A servo control for power-assisted steering for motor vehicles having two coaxial shaft parts that are positively coupled to each other, but with play. The shaft parts are coupled such that limited relative rotations between these shaft parts are possible against the resistance of a pretensioned spring arranged in between. These relative rotations cause a pivoting stroke of a lever arranged between the shaft parts, this lever thereby actuating the control spool of a servo valve.

10 Claims, 3 Drawing Sheets

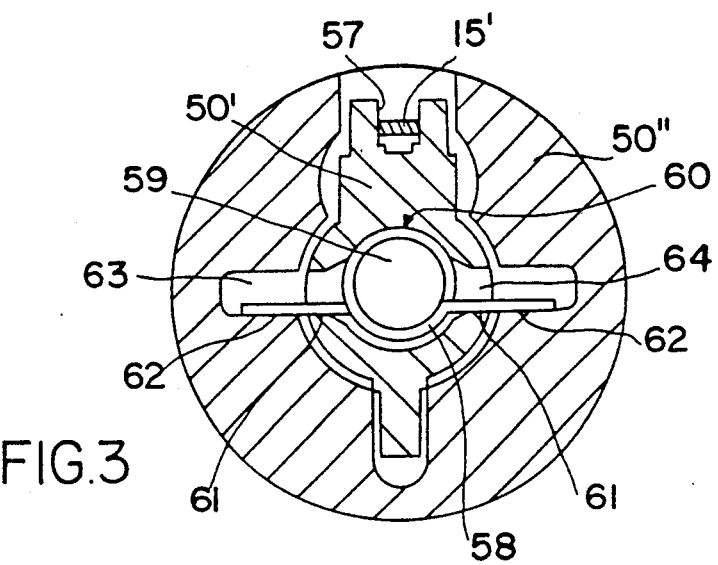
FIG.3
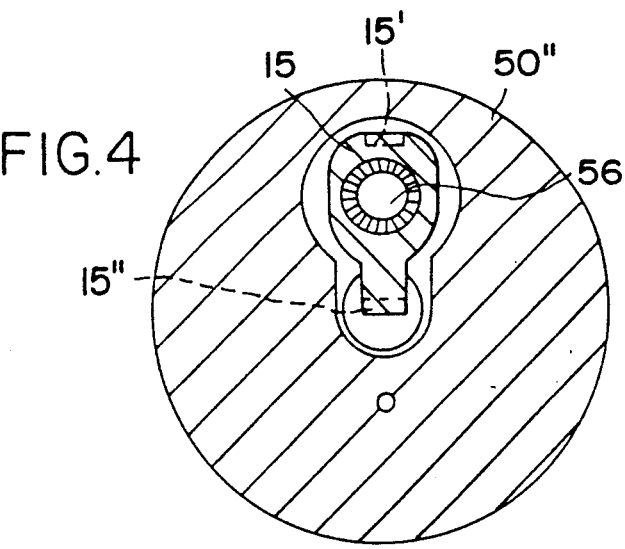
FIG.4
FIG.5
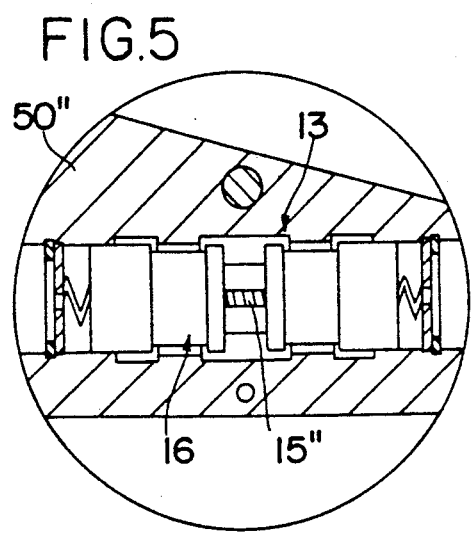

HYDRAULIC AUXILIARY-FORCE CONTROL OF STEERING

BACKGROUND AND SUMMARY OF THE INVENTION

The present invention relates to a hydraulic auxiliary-force control, in particular hydraulic auxiliary-force steering (power-assisted steering) for motor vehicles, comprising a shaft part on the manipulating side, which is allocated to the conventional steering wheel, as well as a shaft part coaxial thereto on the control-gear side, a servo-valve unit arranged on one shaft part and having a displaceable control spool, a control member adjusting the control spool as a function of relative rotations between the shaft parts, and a spring unit which is effective between the shaft parts and attempts to press the shaft parts as well as the control member into a center position relative to one another.

A hydraulic auxiliary-force steering is described in German Examined Patent Application 1,924,032. In this publication, the spring unit between the shaft parts is formed by a torsion bar which is accommodated in longitudinal bores of the shaft parts. At each of its ends, the torsion bar is connected to one of the shaft parts in such a way as to be fixed in terms of rotation, the connection being effected by pins which pass through radial bores, in alignment with one another, in the shaft parts as well as the allocated ends of the torsion bar. The manufacturing effort associated therewith is comparatively great.

In addition, it is disadvantageous in this known auxiliary-force steering arrangement that the torsion bar yields elastically even at small torques effective between the shaft parts, and in fact even when the torsion bar is dimensioned to be rigid. The result of this is that the control spool of the servo valve is pushed away from its center position even at small transmitted torques. Thus a more or less large auxiliary force is always effective. This is often undesirable, particularly in auxiliary-force steering systems, since the roadway condition or the driving circumstances have hardly any influence on the subjective driving feel on the steering wheel.

European Patent Specification 0,190,960 describes a hydraulic auxiliary-force steering arrangement in which a shaft part on the manipulating side and a shaft part coaxial thereto on the control-gear side are elastically coupled to one another in such a way that, during relative rotations of the two shaft parts, an annular part arranged between them is axially displaced. This axial stroke is transmitted by a lever mechanism to the spool of a servo valve.

This arrangement is comparatively expensive. In addition, the spool of the servo valve here is displaced even at relatively small torques effective between the shaft parts. This is because even when the spring unit is dimensioned to be rigid, it yields even in the face of small forces, even if only slightly.

In an auxiliary-force steering arrangement disclosed in German Unexamined Patent Application 3,545,858, a lever acting as a regulating member for the valve spool of the servo valve is arranged between two coaxial shaft parts. This lever is pivotably articulated on one shaft part, or a part firmly connected thereto, about an eccentric axis approximately parallel to the shaft axis as well as on the other shaft part, (or part firmly connected thereto). The lever is at a radial distance from the eccentric axis as well as from the shaft axis and, with one lever end, actuates the control spool. Effective between the regulating lever and one shaft part is a spring unit which attempts to press the regulating lever into a center position relative to the one shaft part. Accordingly, the regulating lever assumes a double function. On the one hand, it serves to actuate the control spool and, on the other hand, it serves, together with the spring unit, to produce a restoring force which forces the shaft parts as well as the regulating lever into a normal position relative to one another. In addition, this regulating lever also limits the possible relative rotation between the shaft parts by its interaction with stops arranged on one shaft part.

This known auxiliary-force control is distinguished by a small space requirement and relatively small demands on the capacity of the pressure source of the auxiliary-force steering. Furthermore, the spring unit is designed in such a way that it can have more or less high preloading and accordingly only permits a relative rotation of the shaft parts at a minimum torque between the same so that an auxiliary force is produced only when the minimum torque is exceeded. Nonetheless, a constructive simplification of this known auxiliary-force control is desirable.

An object of the present invention is to provide an auxiliary-force control in which the effort involved in assembly is relatively slight, while at the same time making it possible for an auxiliary force to be produced only when a minimum torque is reached between the shaft parts.

This and other objects are achieved by the present invention which provides a hydraulic auxiliary-force steering control for motor vehicles comprising a shaft having a first shaft part on a manipulating side, a second shaft part coaxial to the first shaft part on a control-gear side, and a shaft axis. A servo-valve unit is arranged on one of the first or second shaft parts and has a displaceable control spool. A regulating member is coupled to the control spool and adjusts the control spool as a function of relative rotations between the first and second shaft parts. A spring unit between the first and second shaft parts is biased to press the first and second shaft parts and the regulating member into a center position relative to one another. The spring unit comprises a leg spring with legs and a helical spring area connecting the legs. A central recess and first radial slots with shoulders are provided in one of the first or second shaft parts. The central recess accommodates the helical spring area and the shoulders of said first radial slots serves as seating for the legs. Second radial slots with walls are provided in the other of the first or second shaft parts, these legs extending into the second radial slots. The legs of the leg spring bear against at least one of the walls of the second radial slots and against at least one of the shoulders of the first radial slots when the first and second shaft parts are in the center position relative to one another.

On account of the arrangement and design according to the invention, the leg spring, during assembly of the auxiliary-force control, can be inserted into the said recess on one shaft part or on the part firmly connected thereto. The leg spring maintains this position on account of its preloading, since it is firmly secured in the recess by frictional connection with walls of the recess or allocated slots. Thus the leg spring at the same time assumes a position in which the two shaft parts can be assembled virtually free from force in their center position relative to one another.

In addition, it is advantageous that the leg spring is effective directly between the shaft parts and is arranged separately from the control member. By this functional separation, the assembly of regulating member and spring unit is additionally facilitated.

Other objects, advantages and novel features of the present invention will become apparent from the following detailed description of the invention when considered in conjunction with the accompanying drawings.

BRIEF DESCRIPTION OF THE DRAWINGS

FIG. 3 shows a radial section of the shaft parts along section line III—III in FIG. 2.

FIG. 4 shows a radial section of the shaft part on the steering-gear side along section line IV—IV in FIG. 2.

FIG. 5 shows a radial section of the shaft part on the steering-gear side in the area of the control spool along section line V—V in FIG. 2.

DETAILED DESCRIPTION OF THE DRAWINGS

Figure 1:
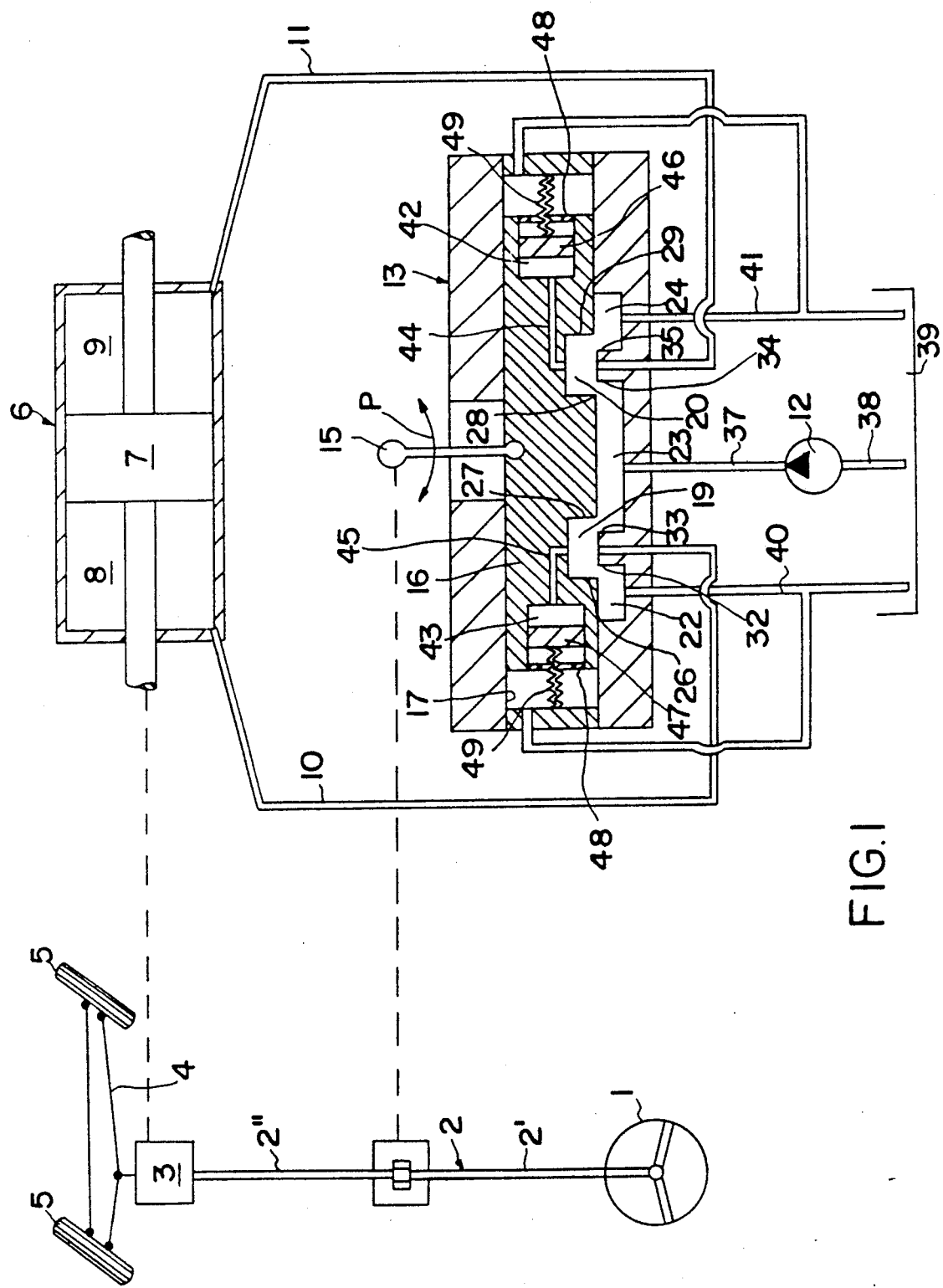
FIG. 1 shows a basic circuit diagram of the power-assisted steering constructed according to an embodiment of the present invention.

FIG. 1 illustrates the functional principle of the power-assisted steering according to the present invention. A conventional steering wheel 1 is arranged in front of the driver's seat in the motor vehicle and which, via a steering shaft 2 connected to it in such a way as to be fixed in terms of rotation, actuates a steering gear 3. By means of a steering linkage 4, the steering gear 3 turns the steered wheels 5 of the vehicle to the right or left in accordance with the direction of rotation of the steering wheel 1. In order to reduce the expenditure of force with which the steering wheel 1 has to be actuated, a servomotor 6 is provided which in turn assists the work of the steering gear 3, i.e. it produces part of the regulating forces required for controlling the steered wheels 5.

In this arrangement, the servomotor 6 can be, for example, a piston-cylinder unit having a double-acting piston 7 which in FIG. 1 is displaced to the right or left, depending on whether the chamber 8 arranged on one side of the piston 7 or the chamber 9 located on the other side of the piston 7 has a higher pressure of the fluid medium, generally hydraulic oil.

In order to obtain the movements of the piston 7 which are desired in each case, the chambers 8 and 9 are connected to the pressure side of a pump 12 via fluid lines 10 and 11. The pressures in the chambers 8 and 9 are controlled or changed by a control-valve unit 13.

The control-valve unit 13 is in turn controlled by a regulating member 15 which is connected between two shaft parts 2' and 2" of the steering shaft 2. The two steering-shaft parts 2' and 2" can mutually rotate to a limited extent relative to one another under the effect of the regulating force to be transmitted by the steering shaft 2. A spring unit (not shown in FIG. 1) is increasingly loaded between the shaft parts 2' and 2", this spring unit continually attempting to press the shaft parts 2' and 2" into a center position. The relative rotation of the shaft parts 2' and 2" is converted by the regulating member 15 into a regulating stroke of a control spool 16 of the servo-valve unit 13.

The control spool 16 is displaceably arranged as a piston-like part in a bore 17 of the housing of the control-valve unit 13, this housing being firmly connected to one shaft part 2' or 2". Arranged on the control spool 16 and on the bore 17 are recesses 19 and 20 and 22, 23, 24, in such a way that the first recesses 19 and 20 in the spool 16 are wider in the axial direction of the control spool 16 than the webs remaining between the recesses 22, 23, 24 of the bore 17. The recesses 19 and 20 have control edges 26–29 which interact with control edges 32–35 on the recesses 22, 23, 24 in a manner described further below.

The fluid lines 10 and 11 already mentioned branch off from the chambers formed by the recesses 19 and 20. The chamber formed by the recess 23 is connected to the pressure line 37 of the pump 12, whose suction line 38 leads to a reservoir 39 for the fluid medium. The chambers formed by the recesses 22 and 24 are in turn connected via lines 40 and 41 to the reservoir 39.

In the center position shown of the control spool 16, the fluid fed via the pressure line 37 into the recess 23, at the two ends of the recess 23, flows between the control edges 27 and 33 and 28 and 34 into the recesses 19 and 20. From these recesses 19, 20, the fluid enters into the fluid lines 10 and 11 and thus into the chambers 8 and 9 of the piston-cylinder unit 6, and also passes between the control edges 26 and 32 and 29 and 35 into the recesses 22 and 24. From there, the fluid flows through the lines 40 and 41 back into the reservoir 39.

In the center position shown of the control spool 16, an equal pressure arises in the chambers 8 and 9, since the chambers formed by the recesses 19 and 20 are also at equal pressures. The recesses 19 and 20 are at equal pressures since the cross-sections remaining between the control edges 28 and 34, and 29 and 35 are the same size as the free cross-sections between the control edges 27 and 33, and 26 and 32.

If the regulating member 15 now displaces the control spool 16, for example, to the left, the free gaps between the control edges 27 and 33, and 29 and 35 narrow, while the gaps between the control edges 26 and 32, and 28 and 34 widen. Thus different pressures arise in the chambers formed by the recesses 19 and 20, a low pressure being achieved in the area of the recess 19 and a high pressure being achieved in the area of the recess 20. This is achieved since the inflow of the fluid medium to the recess 19 is restricted while at the same time the outflow of the fluid medium from the recess 19 is eased. At the same time, in the recess 20 the inflow of the fluid medium is eased and the outflow of the fluid medium is restricted. In the extreme case, the inflow to the recess 19 between the control edges 27 and 33 is completely shut off, while the inflow to the recess 20 is completely opened and the outflow between the control edges 29 and 35 is completely closed.

The different pressures in the chambers formed by the recesses 19 and 20 also arise via the fluid lines 10 and 11 in the chambers 8 and 9 of the piston-cylinder unit 6 so that the piston 7, when the control spool 16 is displaced to the left, is likewise displaced to the left, the regulating force produced depending upon the extent of the displacement of the control spool 16.

If the control spool 16 is displaced to the right, a pressure gradient arises in the opposite direction in the chambers 8 and 9 of the piston-cylinder unit 6 so that the piston 7 attempts to push to the right with a regulating force which again depends upon the extent of the displacement of the control spool 16.

The extent of the displacement of the control spool 16 is dependent upon the regulating stroke of the regulating member 15 produced in each case, and the regulating stroke in turn is dependent upon the extent of the relative rotation between the shaft parts 2' and 2", which is dependent upon the moment to be transmitted by the steering shaft 2. The control spool 16, etc., is thereby displaced in one or the other direction, depending on the direction of the rotation of the steering shaft 2, the greater the resistance is which is set up by the steered wheels 5 against actuation of the steering wheel 1. Accordingly, the regulating forces which are produced by the servomotor 6 and assist the actuation of the steering also increase, this actuation being effected in each case by means of the steering wheel 1.

The dependency or proportionality between the regulating forces produced by the servomotor 6 and the torque transmitted by the steering shaft 2 can be changed by further measures, as seen in FIG. 1.

For example, it is possible to arrange axial blind bores 42 and 43 at the front ends of the control spool 16. These blind bores 42 and 43, via channels 44 and 45 in the control spool 16, are connected to the chambers which are formed by the recesses 19 and 20 and to which the fluid lines 10 and 11 are attached. Pistons 46 and 47 are displaceably arranged in the blind bores 42 and 43, the displacement distance being limited by annular stops 48. The pistons 46, 47 are acted upon by compression springs 49 whose ends remote from the pistons 46, 47 are supported on fixed parts of the housing of the control-valve unit 13.

In the embodiment of the invention illustrated in FIG. 1, a distinctly linear connection between the torques transmitted by the steering shaft 2 and the regulating forces produced by the servomotor 6 is achieved, since the regulating forces react directly on the steering shaft 2.

Figure 2:
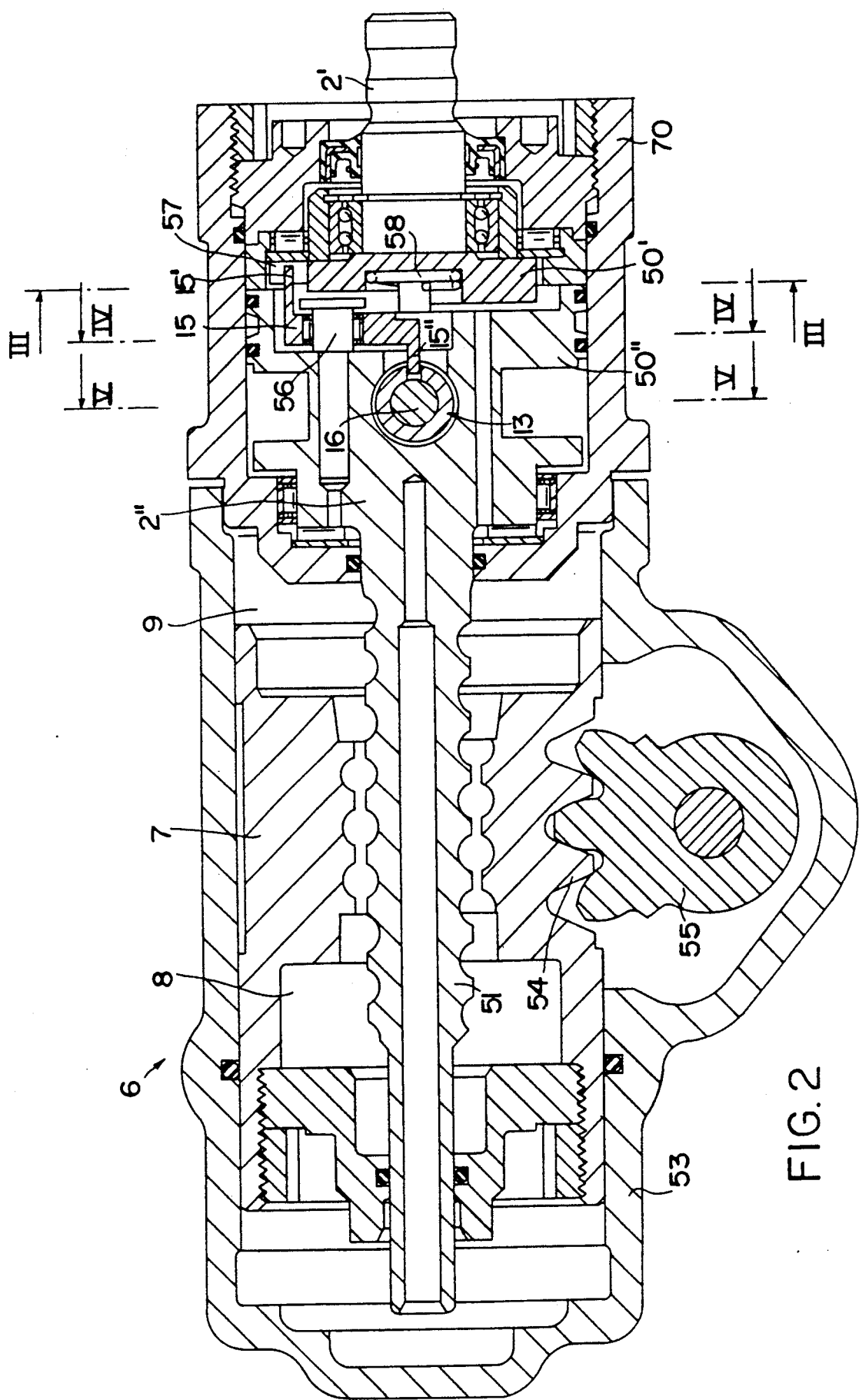
FIG. 2 shows a sectional view of an embodiment of the present invention, the plane section lying in an axial plane of the shaft parts.

In the embodiment of the servo control shown in FIG. 2, an output-side shaft part 2" which continues in a worm spindle 51 is arranged coaxially to the one shaft part 2' that is fixedly connected (with respect to rotation) to the steering wheel 1 (see also FIG. 1).

The piston 7 is displaced on the spindle 51 during rotation of the spindle 51. The piston 7 is displaceably guided in the housing 53 of a steering gear and meshes via a lateral tooth system 54 with a toothed segment 55 which in turn drives a linkage (not shown) for controlling the steered vehicle wheels (see also FIG. 1).

The piston 7, inside the housing 53, separates the chambers 8 and 9 arranged at its front ends from one another. The chambers 8 and 9 are filled with hydraulic medium and can be pressurized with different pressures in such a way that the displacement of the piston 7 is hydraulically assisted when the worm spindle 51 is rotated by rotation of the shaft part 2' and the shaft part 2" coupled to it as a drive. The piston 7, together with the housing 53, thus forms a unit corresponding to the servomotor 6 in FIG. 1. The lines 10 and 11 (see also FIG. 1) supplying the chambers 8 and 9 in FIG. 2 with hydraulic medium are not shown in FIG. 2 for purposes of clarity.

The regulating member 15 designed as a double-arm lever is arranged between the ends, facing one another, of the shaft parts 2' and 2" or between end pieces 50' and 50" firmly arranged on these shaft parts 2' and 2". This lever 15 is rotatably mounted on a pin 56 which is fixed eccentrically to the end piece 50" and parallel to the axis of the shaft parts 2' and 2". At its free ends, this lever 15 has angled portions or extensions 15' and 15" parallel to the pin 56. In the illustrated embodiment, the extension 15' more remote from the axis of the shaft parts 2' and 2" reaches into a radial slot 57 on the end piece 50' of the shaft part 2', as revealed in FIGS. 2 and 3. The other extension 15" located near the axis of the shaft parts 2' and 2" projects through a central front opening in the end piece 50" on the shaft part 2" and is connected in an articulated manner to the control spool 16 of the servo-valve unit 13. This control spool 16, in a corresponding transverse bore of the end part 50" on the shaft part 2", is displaceably arranged transversely to the axis of the shaft parts 2' and 2".

Since the relatively short lever arm having the extension 15' is connected to the end piece 50' of the shaft part 2' at a relatively large distance from the axis of the shaft parts 2' and 2", while the lever arm of the extension 15" has a comparatively large length, relatively small relative rotations between the shaft parts 2' and 2" or their end pieces 50' and 50" lead to a comparatively large displacement of the control spool 16.

As made apparent in particular from FIG. 3, the end piece 50' of the shaft part 2' has a distinctly non-circular cross-section having an extension projecting downwards in FIG. 3 and projects axially into a similarly non-circular front-end recess on the end piece 50" of the shaft part 2" in such a way that the end pieces 50' and 50" are coupled to one another like a dog clutch, but with play, and are able to perform a limited rotation relative to one another. In accordance with this limited relative rotation between the end pieces 50' and 50", the double-arm regulating lever 15' also performs a limited pivoting stroke which produces a correspondingly limited displacement of the control spool 16.

The end pieces 50' and 50" and thus the shaft parts 2' and 2", by means of a leg spring 58 (FIG. 2), are clamped relative to one another into a center position in which the regulating lever 15 and accordingly the control spool 16 also assume a center position. As seen in FIG. 3, the leg spring 58 has a helical-spring area which connects its two legs and is inserted into a front-end, central blind bore 59, open towards the end piece 50", on the end piece 50' of the shaft part 2'.

The leg spring 58 is preloaded in such a way that the helical-spring area bears against a supporting point 60 on the wall of the blind bore 59, and the legs bear against shoulders 61 on the end piece 50'. At the same time, the free ends of the legs rest on walls 62, in alignment with the shoulders 61, of radial slots 63 in the end piece 50" when the end pieces 50' and 50" assume their center position, illustrated in FIG. 3, relative to one another. The radial slots 63 are open at the front end of the end piece 50" facing the end piece 50'. In a similar manner, radial slots 64 open at the front end towards the end piece 50" are arranged on the end piece 50', one of the walls of the radial slots 64 being formed by the shoulders 61.

If the end pieces 50' and 50" are rotated relative to one another, one shoulder 61 moves away from the allocated leg of the leg spring 58, with this leg of the leg spring 58 remaining resting on the wall 62 of the allocated radial slot 63 in the end piece 50". At the same time, the other shoulder 61 lifts the other leg of the leg spring 58 from the wall 62 of the allocated radial slot 63 in the end piece 50". The loading of the leg spring 58 is thereby increased independently of the direction of rotation of the end pieces 50' and 50" when the end pieces 50' and 50" are deflected from their center position relative to one another.

The leg spring 58 shown can have comparatively large preloading and at the same time a relatively low spring rate. This amounts to the fact that the end pieces 50' and 50" can only rotate relative to one another when a minimum torque predetermined by the preloading of the leg spring 58 is effective between the end pieces 50' and 50". On account of the relatively low spring rate, a comparatively small additional torque, after the minimum torque is exceeded, is then sufficient to produce a relative rotation between the end pieces 50' and 50".

At the same time, this means that the servomotor 6 (FIG. 1) is only effective when the forces necessary for adjusting the steered wheels 5 exceed a threshold value which is dependent upon the preloading of the leg spring 58. On the other hand, as soon as this threshold value is exceeded, the servomotor 6 acts to the greatest extent for limiting the control forces to be applied to the steering wheel 1 by the driver. In other words, the maximum control forces are only relatively slightly above a threshold value predetermined by the preloading of the leg spring 58.

Thus, the driver is given good feel for the state of the roadway, since the plurality of steering maneuvers during which the steered wheels 5 are adjusted only against a comparatively low resistance take place to the largest extent without servo assistance. On the other hand, steering maneuvers during which the steered wheels 5 are adjusted against a large steering resistance, in particularly maneuvers in restricted positions, can easily be performed on account of the available pronounced servo assistance.

An embodiment assembly of the servo control described above is further described below with reference to FIGS. 4 and 5. The end piece 50" on the shaft part 2" forms the housing of the servo- or control-valve unit 13. The regulating lever 15 is mounted on this end piece 50" or housing of the servo- or control-valve unit 13 by means of the pin 56 so that this regulating lever 15 can be preassembled together with the control-valve unit 13 on or in the end piece 50".

The leg spring 58 can first of all be mounted on the end piece 50', the leg spring 58, on account of its preloading, being securely held on the wall of the blind bore 59 as well as on the shoulders 61 by frictional connection with the supporting point 60.

The regulating lever 15 is now moved into its center position relative to the end piece 50". The end piece 50' plus the leg spring 58 mounted on it is then moved relatively to the end piece 50" into a coaxial center position and is pushed forward axially against the end piece 50". As a result, the extension 15' of the regulating lever 15 slips into the radial slot 57 of the end piece 50', and the free ends of the legs of the leg spring 58 slip into the radial slots 63 of the end piece 50".

In addition, an embodiment of the invention provides for both end pieces 50' and 50" to be accommodated in a housing 70 adjoining or closing off the steering-gear housing 53 and to thus represent a module which is easy to assemble.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A hydraulic auxiliary-force steering control for motor vehicles comprising:
    a shaft having a first shaft part on a manipulating side a second shaft part coaxial to the first shaft part on a control-gear side, and a shaft axis, said first and second shaft parts facing one another;
    a servo-valve unit arranged on one of said first or second shaft parts and having a displaceable control spool;
    a regulating member coupled to the control spool and adjusting the control spool as a function of relative rotations between the first and second shaft parts;
    a spring unit between the first and second shaft parts that is biased to press the first and second shaft parts and the regulating member into a center position relative to one another, said spring unit comprising a leg spring with legs and a helical spring area connecting the legs;
    a central recess and first radial slots with shoulders in one of said first or second shaft parts, said central recess accommodating the helical spring area and said shoulders of said first radial slots serving as seating for the legs, said central recess forming a central blind bore, open towards the other of said first or second shaft parts;
    second radial slots with walls in the other of said first or second shaft parts, said legs extending into the second radial slots, said legs of the leg spring bearing against at least one of the walls of said second radial slots and against at least one of the shoulders of said first radial slots when the first and second shaft parts are in the center position relative to one another.

2. The auxiliary-force steering control of claim 1, wherein the first and second shaft parts have ends that face one another and interlock with play in the manner of a dog clutch.

3. The auxiliary-force steering control of claim 1, wherein the leg spring is preloaded.

4. The auxiliary-force steering control of claim 3, wherein the leg spring has relatively high preloading and a comparatively low spring rate.

5. The auxiliary-force steering control of claim 4, wherein the regulating member is a double-arm regulating lever having a long lever arm on a side of the shaft axis, said long lever arm actuating the control spool, and a short lever arm that points approximately radially outwards relative to the shaft axis and is articulated on one of the first or second shaft parts, said regulating lever being mounted on the other of said first or second shaft parts eccentrically to the shaft axis and pivotable about an axis that is parallel to the shaft axis.

6. A hydraulic auxiliary-force steering control for motor vehicles comprising:
    a shaft having a first shaft part on a manipulating side, a second shaft part coaxial to the first shaft part on a control-gear side, and a shaft axis, said first and second shaft parts facing one another;
    a first end part fixedly connected to the first shaft part and a second end part fixedly connected to the second shaft part;
    a servo-valve unit arranged on one of said first or second shaft parts and having a displaceable control spool;
    a regulating member coupled to the control spool and adjusting the control spool as a function of relative rotations between the first and second shaft parts;

a spring unit between the first and second shaft parts that is biased to press the first and second shaft parts and the regulating member into a center position relative to one another, said spring unit comprising a leg spring with legs and a helical spring area connecting the legs;

a central recess and first radial slots with shoulders in one of said first or second end parts, said central recess accommodating the helical spring area and said shoulders of said first radial slots serving as seating for the legs, said central recess forming a central blind bore, open towards the other of said first or second shaft parts;

second radial slots with walls in the other of said first or second end parts, said legs extending into the second radial slots, said legs of the leg spring bearing against at least one of the walls of said second radial slots and against at least one of the shoulders of said first radial slots when the first and second shaft parts are in the center position relative to one another.

7. The auxiliary-force steering control of claim 6, wherein the first and second end parts have ends that face one another and interlock with play in the manner of a dog clutch.

8. The auxiliary-force steering control of claim 6, wherein the leg spring is preloaded.

9. The auxiliary-force steering control of claim 8, wherein the leg spring has relatively high preloading and a comparatively low spring rate.

10. The auxiliary-force steering control of claim 9, wherein the regulating member is a double-arm regulating lever having a long lever arm on a side of the shaft axis, said long lever arm actuating the control spool, and a short lever arm that points approximately radially outwards relative to the shaft axis and is articulated on one of the first or second end parts, said regulating lever being mounted on the other of said first or second end parts eccentrically to the shaft axis and pivotable about an axis that is parallel to the shaft axis.

* * * * *